(12) United States Patent
Kornblit et al.

(10) Patent No.: US 6,912,090 B2
(45) Date of Patent: Jun. 28, 2005

(54) ADJUSTABLE COMPOUND MICROLENS APPARATUS WITH MEMS CONTROLLER

(75) Inventors: Avinoam Kornblit, Highland Park, NJ (US); Stanley Pau, Hoboken, NJ (US); Maria Elina Simon, New Providence, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 10/391,330

(22) Filed: Mar. 18, 2003

(65) Prior Publication Data

US 2004/0184155 A1 Sep. 23, 2004

(51) Int. Cl.$^7$ .............................................. G02B 27/10

(52) U.S. Cl. ........................ 359/619; 359/621; 359/622

(58) Field of Search ................... 359/619, 621–622, 359/646, 651, 661, 679, 748, 753, 793

(56) References Cited

U.S. PATENT DOCUMENTS

| | | | |
|---|---|---|---|
| 5,286,338 A | 2/1994 | Feldblum et al. | 156/643 |
| 5,734,490 A | 3/1998 | Rabarot et al. | 359/210 |
| 5,805,352 A | 9/1998 | Kawamura | 359/692 |
| 5,909,321 A | 6/1999 | Kuno et al. | 359/793 |
| 5,923,480 A | 7/1999 | Labeye | 359/814 |
| 6,091,537 A * | 7/2000 | Sun et al. | 359/248 |
| 6,091,549 A | 7/2000 | McDonald et al. | 359/637 |
| 6,577,793 B2 * | 6/2003 | Vaganov | 385/52 |
| 6,636,653 B2 * | 10/2003 | Miracky et al. | 385/14 |
| 2001/0055119 A1 * | 12/2001 | Wood et al. | 356/519 |
| 2003/0076754 A1 * | 4/2003 | Matsui | 369/44.22 |
| 2004/0042085 A1 * | 3/2004 | Hough | 359/619 |

FOREIGN PATENT DOCUMENTS

WO    0201274    1/2002    ........... G02B/26/02

OTHER PUBLICATIONS

L. Erdmann et al., *Technique for monolithic fabrication of silicon microlenses with selectable rim angles*, Opt. Eng., vol. 36, No. 4, pp. 1094–1098 (Apr. 1997).

R. A. Miller et al., *Micromachined electromagnetic scanning mirrors*, Opt. Eng., vol. 36, No. 5, pp. 1399–1407 (May 1997).

C. A. Bolle, *Method for Compensating for Nonuniform Etch Profiles*, U.S. patent application, Ser. No. 10/010570, filed on Nov. 13, 2001 and assigned to the assignee hereof (no copy enclosed).

L. Erdmann et al., "Technique for monolithic fabrication of silicon microlenses with selectable rim angles," *Opt. Eng.*, vol. 36, No. 4, pp. 1094–1098 (Apr. 1997).

* cited by examiner

Primary Examiner—Jordan M. Schwartz
Assistant Examiner—Jessica Stultz

(57) ABSTRACT

An adjustable compound optical microlens apparatus comprises first and second microlenses that are separated from one another along their optical axes. At least one of the microlenses is movable relative to the other. In a preferred embodiment, one microlens is stationary, the other movable. A MEMS controller electrically controls the position of the movable microlens relative to the stationary microlens, or the positions of at least two movable microlenses relative to one another. In accordance with one embodiment of our invention, an array of such microlens apparatuses is also contemplated, especially for applications such optical switches and routers. In accordance with another embodiment of our invention, the apparatus functions as an optical filter or dispersion compensator. Also described is method of compensating for variations in an optical parameter (e.g., effective focal length) of such an apparatus in an array.

21 Claims, 15 Drawing Sheets

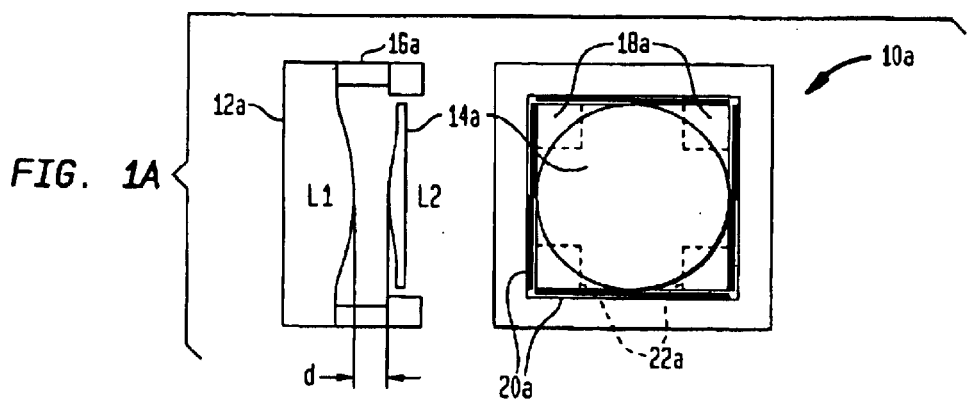
FIG. 1A
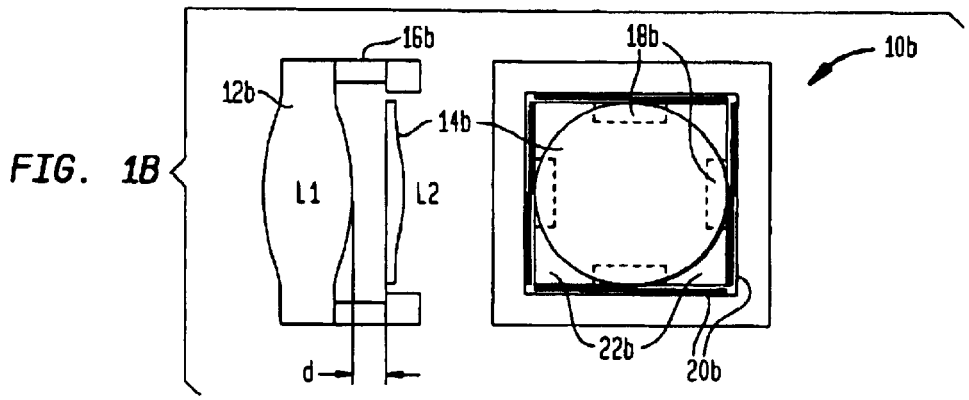
FIG. 1B
FIG. 1C
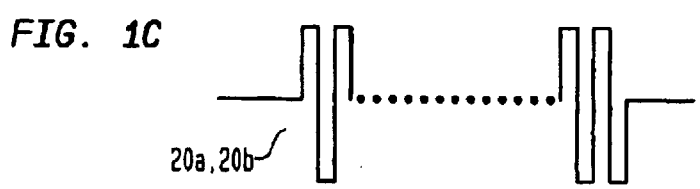
FIG. 2
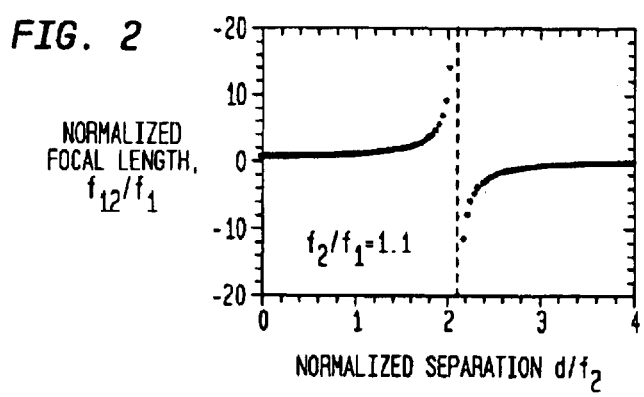

ADJUSTABLE COMPOUND MICROLENS APPARATUS WITH MEMS CONTROLLER

BACKGROUND OF THE INVENTION

1. Field of the Invention

This invention relates to compound microlenses and, more particularly, to compound microlenses that are controlled by a micro-electromechanical structure or subsystem (MEMS).

2. Discussion of the Related Art

In the optoelectronic art optical lenses have many applications as both individual lens elements (single or compound lenses) or as arrays of such elements. Individual lens elements are used, for example, to couple an optical source (e.g., a laser) to an optical receptor. Receptors include well-known optical waveguides (e.g., optical fibers and silica waveguides), well-known photodetectors (e.g., p-i-n and avalanche photodiodes), and other optical devices. On the other hand, an array of such lenses can perform the same coupling function between an array of optical sources and an array of optical receptors. The coupling function may include one or more of the following function species: focusing, collimating and shaping.

State-of-the-art lens arrays include microlenses that are etched in a semiconductor (e.g., Si) or a dielectric (e.g., a silica-based glass) body. There are many techniques to fabricate such a microlens array. Most involve standard photolithographic processing techniques. Whenever a master is available, a microlens array can be duplicated using molding techniques. For many applications, large focal length uniformity across all lenses is desired, but is not necessarily achieved because of defects in the materials and variations in the process (e.g., in the etch profile). One approach to solving the latter problem is described by C. Bolle in copending U.S. patent application Ser. No. 10/010, 570, entitled *Method for Compensating for Nonunifrom Etch Profiles*. The application, which was filed on Nov. 13, 2001 and assigned to the assignee hereof, is incorporated herein by reference. Another prior art technique for making Si microlenses is described by L. Erdmann et al., *Opt. Eng.*, Vol. 36, No. 4, pp. 1094–1098 (1977), which is also incorporated herein by reference.

In theory at least, such individual microlenses or microlens arrays can be fabricated from other materials such as plastic. In practice, however, the choice of material often depends on the precision demanded by the particular application. For example, many optoelectronic applications discussed below require extremely high precision in the way that light beams are coupled from one device/element to another. These applications dictate the use of a material (e.g., Si) that has a mature processing technology that enables the microlenses to be shaped with corresponding precision.

A microlens array is an essential component for many types of optical subsystems, such as optical switches, routers, attenuators, filters, equalizers and dispersion compensators. In typical applications, the microlens array is used to collimate optical beams from an array of fibers or lasers and to focus them onto an array of receptors.

Conventional optical routers and switches use arrays of microlenses to collimate/focus optical beams from an array of optical input fibers to an array of optical output fibers, so that the coupling between the two arrays is efficient. The collimating and focusing functions serve to match the diameter of the optical beams to the aperture of the optical fibers. In a MEMS structure, such conventional microlens arrays generally do not provide optimal coupling of the optical beams to the optical fibers for several reasons. First, the lens curvature varies from lens to lens due to limited manufacturing tolerances. These curvature variations lead to focal length variations, which, in turn, lead to optical beam diameter variations in the optical output fibers. Second, optical path lengths between different pairs of input and output fibers vary for different routings, which leads to variations in beam diameters at the output fibers.

BRIEF SUMMARY OF THE INVENTION

In accordance with one aspect of our invention, an adjustable compound optical microlens apparatus comprises first and second microlenses that are separated from one another along their optical axes. At least one of the microlenses is movable relative to the other. In a preferred embodiment, one microlens is stationary, the other movable. A MEMS controller electrically controls the position of the movable microlens relative to the stationary microlens, or the positions of at least two movable microlenses relative to one another.

In accordance with one embodiment of our invention, an array of such microlens apparatuses is also contemplated, especially for applications such as optical switches and routers.

In accordance with another embodiment of our invention the facing optical surfaces of the microlenses include partially transmissive metal coatings, so that the apparatus functions as an optical filter or dispersion compensator.

In accordance with another aspect of our invention, a method of compensating for variations in an optical parameter (e.g., effective focal length) of a first apparatus in an array comprises the steps of: (a) determining that the first apparatus in the array has a value of the parameter different from a predetermined standard value; and (b) applying an electrical signal to the MEMS controller of the first apparatus, thereby causing the controller to perform a mechanical action that makes the value of the parameter of the first apparatus closer to the standard value. (Illustratively, the mechanical action alters the separation and/or tilt between a pair of microlenses in the first apparatus.) In one embodiment, the standard value is stored (for example, in a computer), and in another embodiment it is determined by the value of the same parameter of a second apparatus in the array. Depending on the application, we contemplate a multiplicity of adjustments over time or a single adjustment followed by fixing all of the movable microlenses in place.

BRIEF DESCRIPTION OF THE SEVERAL VIEWS OF THE DRAWING

Our invention, together with its various features and advantages, can be readily understood from the following more detailed description taken in conjunction with the accompanying drawing, in which:

FIG. 1(a) is a schematic, cross sectional view of a compound microlens apparatus in accordance with one embodiment utilizing a lens doublet having two curved surfaces;

FIG. 1(b) is a schematic, cross sectional view of a compound microlens apparatus in accordance with another embodiment utilizing a lens doublet having three curved surfaces;

FIG. 1(c) is a schematic top view of a serpentine spring is utilized in the embodiments of FIGS. 1(a) and 1(b);

FIG. 2 is a graph of normalized focal length versus normalized lens separation;

DETAILED DESCRIPTION OF THE INVENTION

General Structure

In accordance with various aspects of our invention, the following sections describe the design of MEMS-adjustable (i.e., tunable) compound microlens apparatuses (i.e., either a single apparatus that includes a compound microlens or an array of such apparatuses), as well as methods of making them, and methods of operating them in various systems. Depending on the particular embodiment, the vertical separation between the microlenses along a common optical axis, the horizontal separation of their optical axes and/or the tilt of their optical axes relative to one another can be adjusted by voltages applied via the MEMS. Control of separation and tilt, in turn, allows an optical parameter (e.g., effective focal length) of the microlens apparatus to be altered.

Figure 36:
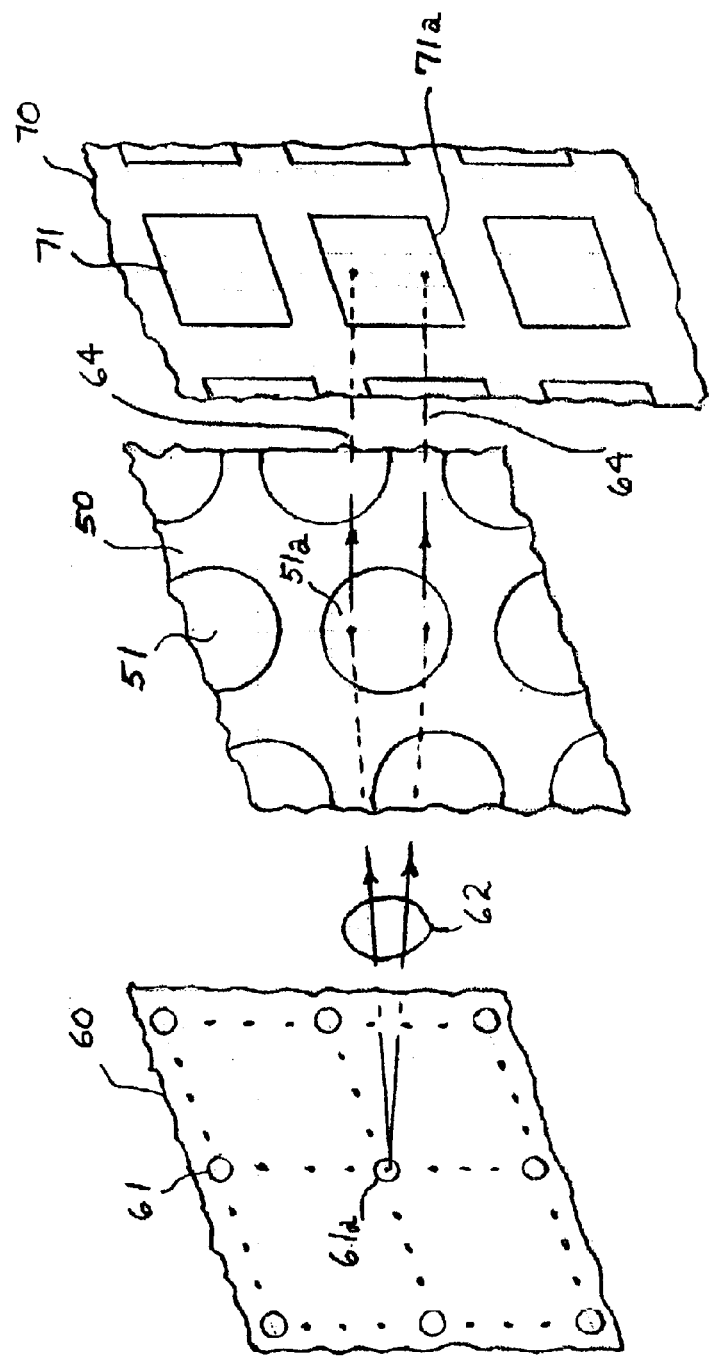
FIG. 36 is a schematic view of another subsystem demonstrating a typical application of an array of compound microlens apparatuses in accordance with one more embodiment of our invention.

A single compound microlens apparatus may be used as an attenuator, equalizer, dispersion compensator, or filter (FIG. 34), for example, or a multiplicity of such apparatuses may be formed as an array (FIG. 36). The pitch of the array may be fixed or variable (in space; not time).

An array of compound microlens apparatuses is particularly useful in applications (e.g., fiber-optic transmission systems) where the uniformity requirement is high or where tunability is desired. The tunable microlens array is envisioned to be included in an optical subsystem (e.g., an optical switch or router) and to be controlled by a feedback voltage source, which adapts the microlens array configurations to internal variations, such as temperature changes, or external variations, such as beam profile changes.

A single apparatus 10a, which includes a microlens doublet and a MEMS controller, is shown schematically in FIG. 1(a). Here, we depict apparatus 10a as including two coaxial microlenses 12a and 14a. At least one of the microlenses is movable. In the case illustrated, lens 14a is movable; lens 12a is stationary, and the doublet has two curved surfaces, one on the interior facing surface of each microlens. Alternatively, a similar apparatus 10b is shown in FIG. 1(b), which also includes a doublet formed by coaxial microlenses 12b (stationary) and 14b (movable). But, in this case the doublet has three curved surfaces, one on each of the interior and exterior surfaces of microlens 12b, and one on the exterior surface of microlens 14b. More than two microlenses (e.g., a triplet), however, and hence more than four curved surfaces, could be utilized if the attendant increase in complexity can be tolerated.

In addition, each lens may be concave or convex, and may be spherical, aspherical, or may have other shapes including anamorphic (e.g., cylindrical).

The microlenses are usually coated with anti-reflection coatings designed to have low reflectivity within a wavelength range determined by the particular system and/or application. (However, reflective coatings are used in some applications such as, for example, filters and dispersion compensators, which are discussed in later sections.)

Figure 13:
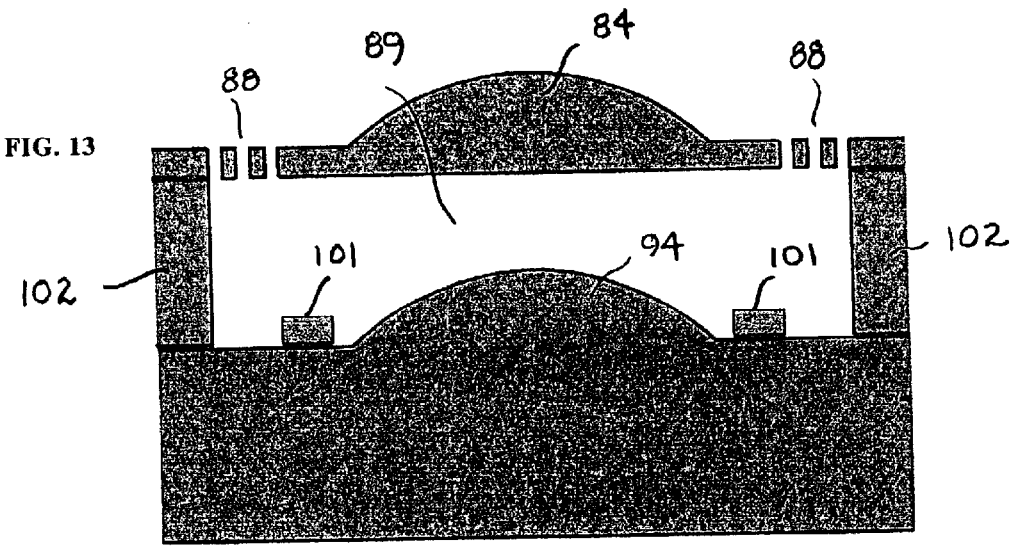
FIG. 13 is a schematic, cross sectional view of a compound microlens apparatus in accordance with one embodiment of our invention utilizing a lens doublet having two curved surfaces and of the type shown in FIG. 1(a)
Figure 14:
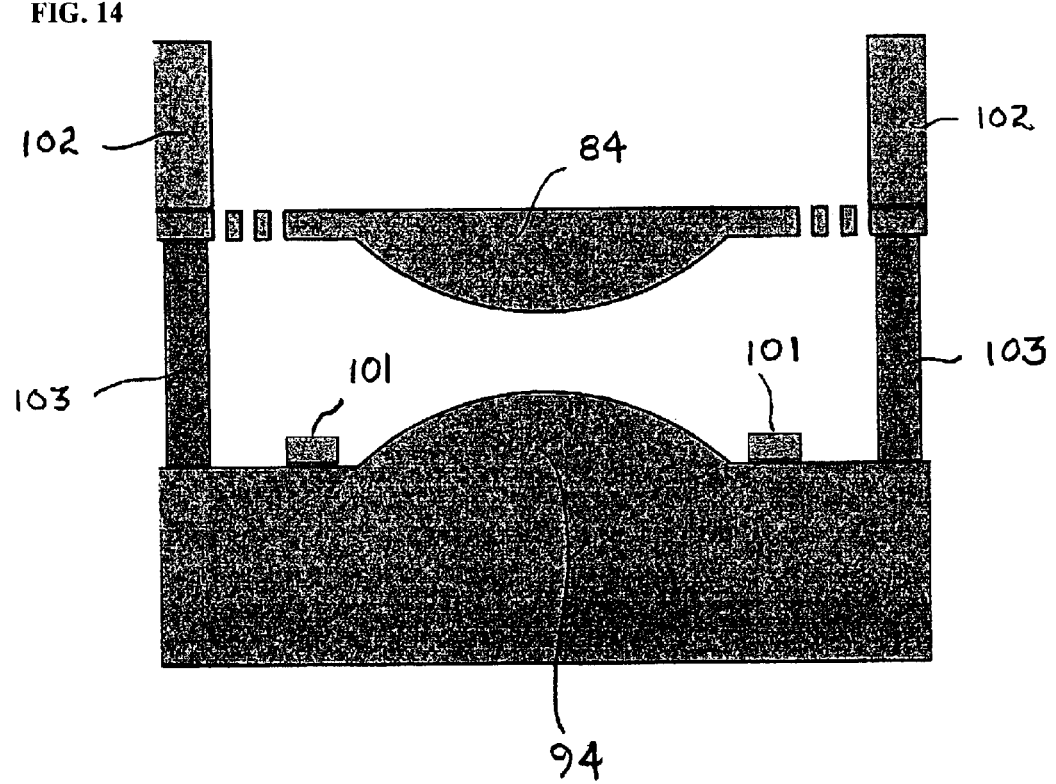
FIG. 14 is a schematic, cross sectional view of a compound microlens apparatus in accordance with another embodiment of our invention utilizing a lens doublet having two curved surfaces and of the type shown in FIG. 1(b)
Figure 33:
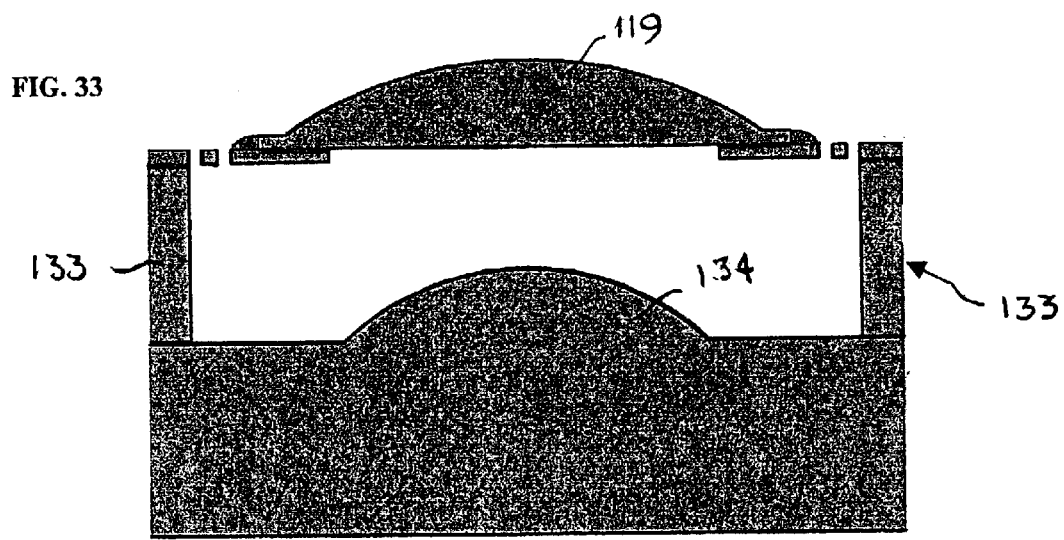
FIG. 33 is a schematic, cross sectional view of a compound microlens apparatus in accordance with another embodiment of our invention utilizing a lens doublet having two curved surfaces and of the type shown in FIG. 1(a)

More detailed, yet still schematic, renderings of various embodiments of single microlens apparatuses in accordance with our invention are shown in FIGS. 13, 14 and 33.

The MEMS portion of each microlens apparatus 10a and 10b includes a support structure 16a and 16b, resilient means 20a and 20b, a top electrode and a multiplicity of bottom electrodes 20a and 20b, as shown in FIGs. 1(a) and 1(b), respectively. The support structures 16a and 16b have openings 22a and 22b (e.g., square openings) in which the movable lenses 14a and 14b, respectively, are suspended. The resilient means 20a and 20b suspend the movable lenses 14a and 4b within the openings 22a and 22b, respectively. Illustratively, the resilient means are serpentine springs 20a and 20b, which for simplicity are depicted only in the top-views of FIGS. 1(a) and 1(b), respectively, and in the expanded top view of FIG. 1(c). Finally, the entire movable microlenses 14a and 14b serve as the top electrodes, whereas the bottom electrodes 18a and 18b are positioned around the perimeter of the stationary microlenses 12a and 12b, respectively. In FIG. 1(a) the electrodes 18a are shown positioned in the four corners of the square opening 22a; in FIG. 1(b) the electrodes 18b are shown positioned at the midpoints of the four sides of the square opening 22b. Other arrangements of the bottom electrodes are also suitable.

Illustratively, the top electrode (movable lens) is coupled to an electrical source of ground potential, and the bottom electrodes are coupled to a source of voltage. Each bottom electrode may have the same or a different voltage applied to it. The embodiments of FIGS. 13 and 14 are designed in this fashion. In these embodiments, the vertical separation, horizontal separation and/or tilt of the microlenses in the doublet may be adjusted (i.e., tuned) by varying the voltages applied to all or any subcombination of the multiplicity of bottom electrodes. However, in order to alter the horizontal separation, the design of FIGS. 1(a) and 1(b) would be modified to enable lateral motion of the movable lens. A typical modified design would include additional electrodes 18 (not shown) around the periphery of the stationary lens and additional springs 20 (not shown) coupling the movable lens to the support structure.

In general, the voltages applied via the MEMS alter the capacitive coupling between the microlenses, thereby causing the microlenses to move relative to one another. For example, when voltages are applied between the multiplicity of bottom electrodes and the top electrode (movable lens) of FIG. 1, the movable microlens 14a, 14b is pulled toward the stationary microlens 12a, 12b, respectively. The serpentine springs 20a, 20b that support the movable lens 12a, 12b, respectively, provide a restoring force and can be designed to allow large variations in the vertical separation d between the microlenses. By increasing the length and number of repetitions of the springs, our invention attains a small spring constant and a large displacement (the amount by which the vertical separation changes).

Alternatively, the top electrode (movable lens) is coupled to a source of voltage and all the bottom electrodes are coupled to an electrical source of ground potential The embodiment of FIG. 33 is designed in this fashion. In this embodiment, the vertical separation between the two microlenses can be adjusted, but not the relative position or tilt.

Assuming both microlenses of the apparatus of FIG. 1 have the same optical axis, the effective focal length, $f_{12}$, of the doublet and its derivative are given by $$f_{12} = \frac{f_1 f_2}{f_1 + f_2 - d}, \quad (1)$$

$$\frac{\partial f_{12}}{\partial d} = \frac{f_{12}^2}{f_1 f_2}, \quad (2)$$

where $f_1$ and $f_2$ are the focal lengths of the two microlenses and d is their vertical separation. The focal length of each of the microlenses is fixed by the processing technique used in its fabrication. (See, the Bolle application and the Erdmann et al. paper cited supra.) For a fixed $f_{12}$ and d, maximum tunability, $\partial f_{12}/\partial d$, occurs near the singularity of FIG. 2 where $$f_1 + f_2 \approx d \quad (3)$$

and smallest value of $f_1 f_2$. Note that depending on the curvatures of the microlenses, $f_1$ and/or $f_2$ can be either positive or negative. A typical functional relationship of the effective focal length as a function of normalized separation is shown in FIG. 2. Note that the variation is small outside the region of singularity where $d/f_2 \sim 2.1$. Changing the ratio, $f_1/f_2$, shifts the curve along the $d/f_2$ axis.

Filter

Figure 34:
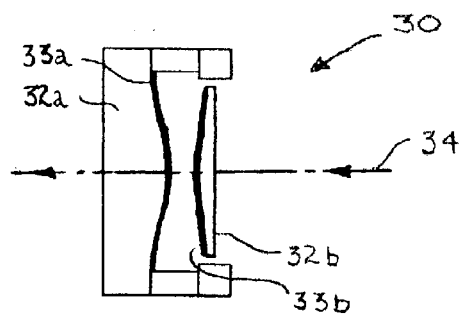
FIG. 34 is a schematic, cross sectional view of a compound microlens apparatus modified to perform the function of a filter or interferometer.

As mentioned above, a tunable compound microlens apparatus may be adapted to perform a filtering function. An illustrative filter 30, a Gire-Tournois (GT) filter (or interferometer), is shown in FIG. 34. The GT filter employs a doublet of the type shown in FIG. 1(a). However, other doublet designs, including (but limited to) that of FIG. 1(b), are also suitable. In FIG. 34, the interior surfaces of microlenses 32a and 32b are coated with reflective coatings 33a and 33b, respectively. These coatings may be metallic, may be multilayered dielectrics, or may be of other suitable design well known in the art. In any case, the two reflective coatings form a cavity resonator. By using the MEMS to change the position of the movable microlens, we can alter the length of the resonator, which in turn allows us to filter the radiation (or light) beam 34 spectrally or spatially. In addition, the GT filter has its own wavelength dispersion characteristic, which may be designed to compensate for the dispersion of another optical device.

Feedback Control Subsystem

Figure 35:
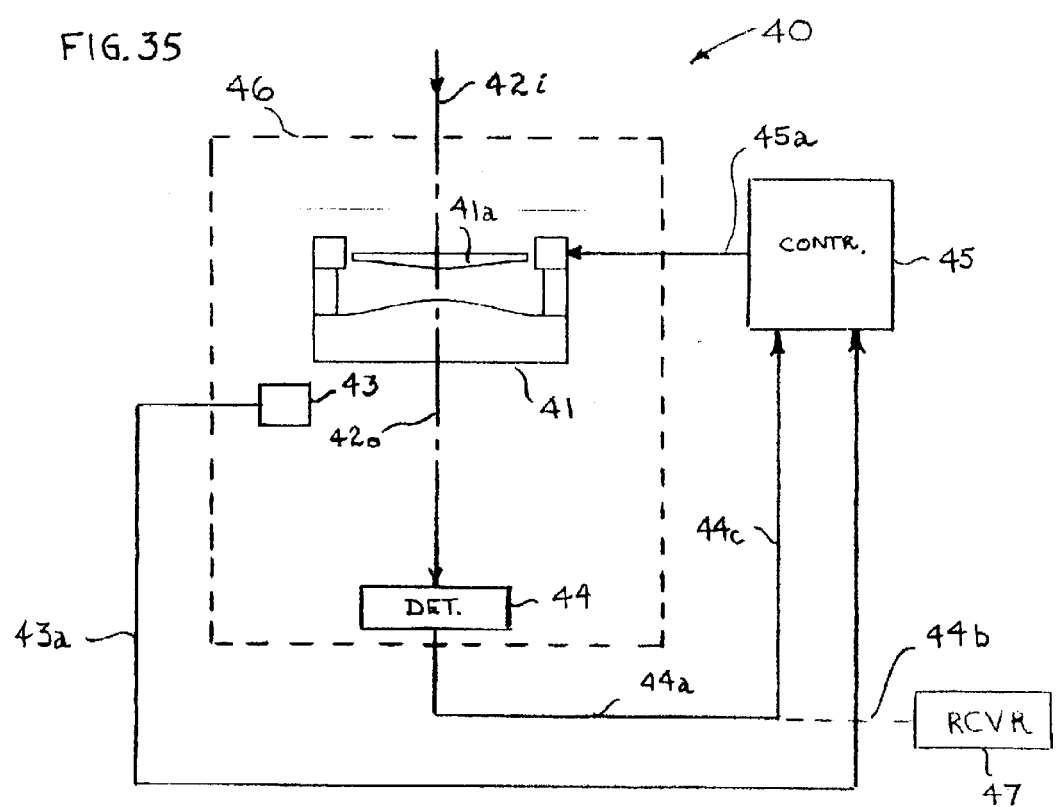
FIG. 35 is a schematic, block diagrammatic view of a subsystem, including a feedback loop, for controlling a compound microlens apparatus in accordance with yet another embodiment of our invention.

In many applications a microlens apparatus, or an array of them, is subject to variable conditions (e.g., temperature, humidity, aging) that cause the apparatus or array to have variable optical parameters (e.g., wavelength, power, beam profile). Thus, as shown in FIG. 35, a divergent input optical beam 42i passes through a microlens apparatus 41 and exits as a collimated output optical beam 42o. (For simplicity, only a single ray of the beams is shown.) If, for example, the temperature of the apparatus 41 changes, as a result of changes in the temperature of its ambient, then the properties (e.g., wavelength, power, beam profile) of the output beam will also change. To stabilize these optical parameters (i.e., the limit their variation to predetermined, acceptable ranges) the apparatus is provided with a feedback control subsystem, which includes a controller 45, a temperature sensor 43, and a photodetector 44. The latter may function as a receiver-detector; e.g., in conjunction with (or as an integral part of) a receiver 47 used to extract information from the output beam 42o, or it may function as a monitor-detector; e.g., in a feedback loop used to sense an optical parameter of the output beam 42o.

Let us assume initially that the photodetector is a receiver-detector, and that the apparatus 41 and the sensor 43 are located within a chamber 46 (e.g., a hermetic chamber). In this case, the photodetector provides an electrical signal (containing information to be decoded) on leads 44a and 44b to receiver 47 (not to controller 45 on lead 44c). Sensor 43 provides an electrical signal (proportional to temperature) on lead 43a to an input of controller 45. The controller, in turn, provides an electrical output signal on lead 45a that provides both (1) coarse adjustment of the position of the movable microlens 41a (in response to a signal that sets its desired initial position) and (2) fine tuning of the position of the movable microlens 41a (in response to signals from the sensor 43).

Alternatively, feedback control may be based on the wavelength, power or spatial profile of the output beam 42o. In this case, photodetector 44 could be used as a monitor-detector to sense changes in these optical parameters and to provide an electrical signal on leads 44a and 44c to another input of controller 45, which functions in a manner similar to that described above to control the position of movable microlens 41a.

The detector 44 is depicted as being located inside the chamber 46, but alternatively it may be located outside provided that transmission means (e.g., a window) is provided for the output beam to be incident on the photodetector.

In contrast, if the apparatus 41 is located in a temperature/humidity controlled environment, then the need for chamber 46 and possibly the temperature sensor 43 would be obviated, and feedback control would be predicated on sensing parameters other than temperature.

Arrays

In an important embodiment of our invention depicted schematically in FIG. 36, a multiplicity of adjustable compound microlens apparatuses 51 form an array 50. Each apparatus 51 includes a compound lens and a MEMS controller of the type described above.

In a typical application, the microlens array couples optical beams from an array 60 of optical sources 61 to an array 70 of optical receptors 71. For purposes of illustration, only two rays (of many) emanating from a typical single source 61a are depicted as forming an optical beam 62 that is incident on microlens array 50. In practice, a multiplicity of sources 61 would simultaneously emit a multiplicity of such beams incident on different apparatuses in the microlens array. As shown, the beam 62 is incident upon a typical microlens apparatus 51a, which collimates the beam. The collimated beam 64 is incident on a typical receptor 71a The array 60 of sources may include an array of active devices such as lasers. Typically the active sources are semiconductor diode lasers that are directly coupled into the microlens array 50. Preferably, the source array 60 comprises an array of vertical cavity, surface-emitting lasers known as VCSELs. Alternatively, the array 60 may include an array of passive devices such as optical input fibers or optical micro-mirrors that couple optical beams into the microlens array 50. We use the terms passive and active in the sense that active devices convert an electrical signal to an optical one, and conversely; passive devices do not (e.g., the latter are illustratively optical waveguides or light beam redirectors).

The array 70 of receptors 71 may likewise include an array of active devices such as photodetectors or an array of passive devices such as output optical fibers, splitters, or micro-mirrors.

An optical router is an important subsystem application of such arrays. For example, in a typical router the source array 60 includes an array of optical fibers coupled at its input end to an array of lasers and at its output end to microlens array 50. The collimated beams (e.g., 64) are directed into an array of well-known micro-mirrors, which perform a beam steering function. After being redirected by the micro-mirror array, the beams are coupled into another microlens array, which refocuses the beams onto the input end of an array of optical output fibers.

Compensation Method

As mentioned earlier, conventional microlens arrays generally do not provide optimal coupling of the optical beams to the optical fibers (or other optical receptors) for several reasons. First, the microlens curvature varies from microlens to microlens due to limited manufacturing tolerances. These curvature variations lead to focal length variation, which, in turn, lead to optical beam diameter variations in the optical output fibers. Second, optical path lengths between different pairs of input and output fibers vary for different routings, which leads to variations in beam diameters at the output fibers.

In accordance with another aspect of our invention, we provide a method of compensating for variations in an optical parameter (e.g., effective focal length) among different ones of individual microlens apparatuses in an array of the type described above. Our compensation method includes: (a) determining that a first apparatus in the array has a value of the parameter different from that of a standard value; and (b) applying an electrical signal to the MEMS controller of the first apparatus, thereby causing the controller to perform a mechanical action that makes the value of the parameter of the first apparatus closer to the standard value. In an illustrative embodiment of this aspect of our invention, the mechanical action alters the vertical separation, horizontal separation and/or tilt between a pair of microlenses in the first apparatus.

Of course, the same method may be applied to a multiplicity of apparatuses that have a value different from that of at least one other apparatus.

In addition, the standard value of the optical parameter may be a predetermined value of that parameter that is (1) extant in a particular second apparatus of the array or (2) stored in a computer, with adjustments being made to those apparatuses that do not satisfy the standard.

Depending on the application, we contemplate a multiplicity of adjustments over time (in the factory or in the field) or a single adjustment (in the factory) followed by fixing the movable lens (or lenses) in place. The latter might be utilized, for example, to optimize the focal system within an assembled router (or switch) and then to lock all of the movable microlenses into position.

Next we describe two methods of fabricating compound microlens apparatus of the type shown in FIGS. 13, 14 and 33. In the corresponding text various materials, dimensions and operating conditions are provided by way of illustration only and, unless otherwise expressly stated, are not intended to limit the scope of the invention.

Fabrication Method I

The fabrication technique below describes the process flow for making adjustable compound microlens apparatus of the type shown in FIG. 13 or 14. We describe the fabrication of the active (movable) lens, the stationary lens and the MEMS, as well as the assembly of the various components. The technique describes an array of such apparatuses, which, however, can be diced or otherwise separated into individual apparatuses, if so desired.

Active Lens

In conjunction with FIGS. 3–9 we describe the fabrication of the active microlens.

Figure 3:
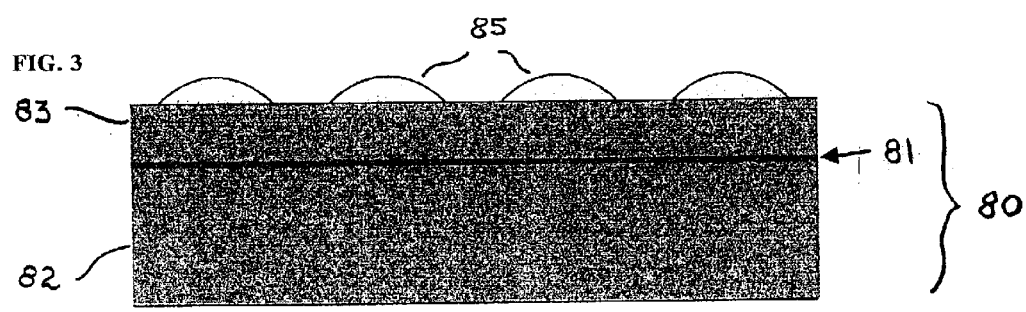
FIGS. 3–12 are schematic, cross-sectional views used to describe various process steps in the fabrication of a compound microlens apparatus shown in FIGS. 13 and 14.

As shown in FIG. 3, the starting material for making the active microlens is a silicon-on-insulator (SOI) wafer 80, which comprises a $SiO_2$ layer 81 buried between a lower Si region (or substrate) 82 and an upper Si region (or layer) 83. SOI wafers are well known, being used, for example, in the fabrication of advanced ICs as well as MEMS. Although a bulk Si wafer can be used instead of an SOI wafer, the process is much more complex, with much narrower process margins. Wafers made of other materials (e.g., fused silica, quartz, zinc oxide or even plastic) or of other semiconductors (e.g., SiGe) can be used.

The starting step is the fabrication of an array of essentially circular (in top view) active microlenses 84 (FIG. 4) on the SOI wafer. In general, these microlenses are created by creating hemispherical masks 85 (FIG. 3) on top of the wafer, and transferring their shapes into the upper Si layer 83. There are number of well-known ways to create this type of shaped mask. Commonly, the mask-making process begins by forming a multiplicity of essentially cylindrical masks (not shown; one for each active microlens) that have their cylinder axes essentially normal to the top surface of the wafer. These masks are formed in a polymer [e.g., photoresist (PR)] layer by standard photolithography. Then, the cylindrically shaped PR masks are flowed by a well-known technique that includes, for example, either baking them at an elevated temperature and/or exposing them to a solvent. Most of these approaches convert the cylindrical masks into essentially hemispherical masks 84 (FIG. 3). Once the mask shape is transferred into the upper Si layer 83, either spherical or aspherical microlenses 84 (FIG. 4) are obtained, depending on the etching conditions (e.g., etchant type and strength; etching time and temperature).

Alternatively, the mask material may be made of a glass that changes shape upon exposure to elevated temperatures.

Figure 4:
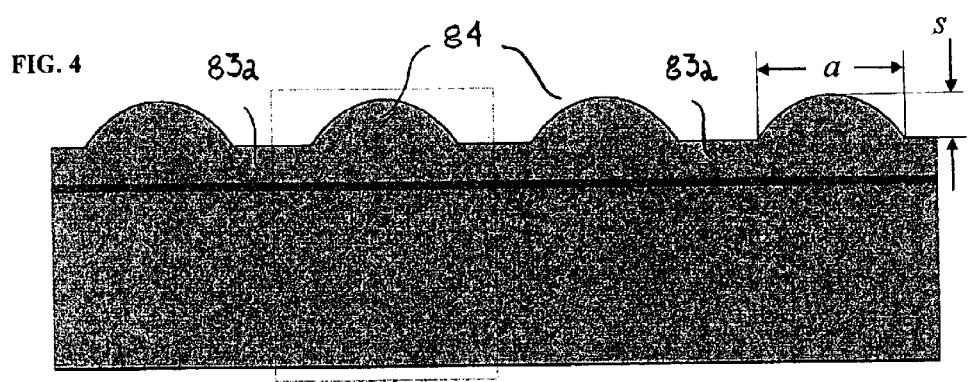

The mask material 85 and the upper Si layer 83 are then etched together to form the microlenses 84 shown in FIG. 4. The lens aperture a, and lens sag, s are designed to fit the particular application. For instance, if the microlens aperture, dictated by the application, is 0.4 mm and the required focal length is 0.4 mm, the sag s will be 20.4 $\mu m$ for a spherical microlens (using a refractive index n=3.48 for Si).

In an illustrative etching process, using $Cl_2$-based chemistry for the etchant, Si etches 1.3 times faster than a novolac-based photoresist (nPR) mask. (Novolac, also spelled novolac, is a well-known phenol formaldehyde resin.) Therefore, the targeted sag height in nPR should be 15.7 μm In an illustrative resist-flow process, the microlens sag in nPR is 1.8 times greater than the nPR thickness, as coated. (A simple calculation, based on volume conservation, shows that a cylinder with aperture (diameter) α, when transformed into a microlens, leads to a sag roughly twice as high as the initial height. However, due to some densification, the sag in the nPR is reduced roughly by 10%, yielding a value of 1.8. Based on these calculations, the target for nPR thickness before reflow is 8.7 μm;

The mask shape obtained by the flow process is essentially hemispherical, as shown in FIG. 3. The etching process affects the shape somewhat, but for the dimensions mentioned above, the deviations from spherical shape are minimal, and for all practical purposes the shape of the curved surface of the Si microlenses 84 (FIG. 4) is spherical (essentially equal etch rates of Si and PR preserve the spherical shape; however, deviations are small for the dimensions in the example above). Once the PR is consumed in its entirety, the shape of the microlenses remains unchanged even if the etching process continues. (Actually, an overetch process is preferred to insure complete PR removal from the entire wafer.) In upper Si layer 83, the remaining regions 83*a* (FIG. 4), which are located between adjacent microlenses, will be used to form the serpentine springs in accordance with one embodiment of our invention. A spring thickness (height) of a few micrometers is adequate. For example, if the desired spring height is 5 μm, the initial thickness of the Si regions 83*a* should be slightly greater than 25.4 μm (the sum of the lens sag and the spring thickness). Uniformity and control in the etching step that forms the springs are important since these process characteristics affect the spring constants.

Figure 5:
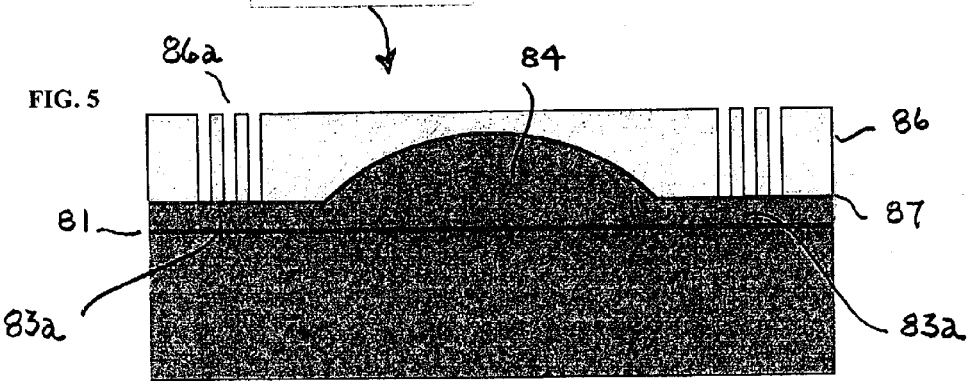
Figure 6:
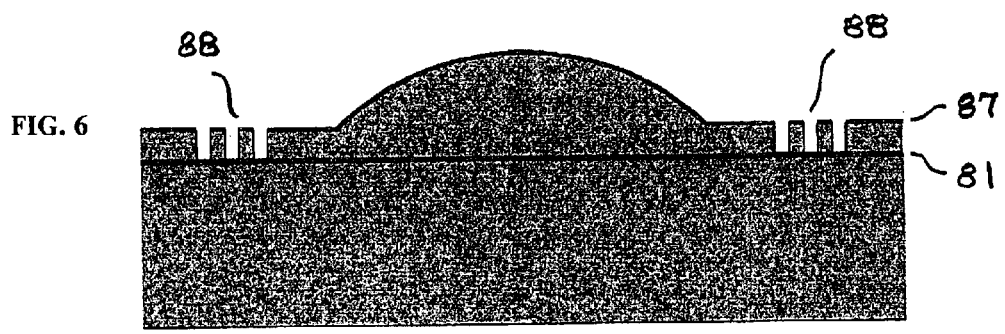

We now turn to FIGS. 5 & 6, which (after a few additional process steps) show exploded views of the outlined section of FIG. 4. These figures illustrate how the springs for the individual microlenses are formed. (Henceforth, we describe only the fabrication of a single microlens apparatus, it being understood that the process is applicable to the fabrication of an array as well.) The mask for this part of the process is PR, a conformal hard mask (e.g., $SiO_2$), or a combination of the two. If only a PR mask is used, it should be thick enough to cover the microlenses during the entire etching process. Simple calculation shows that if the PR flows to produce a flat profile, which is an extreme case, its thickness should be roughly 25 μm. In contrast, if only a $SiO_2$ hard mask is used, its thickness should be at least 1 μm (assuming a 5:1 ratio of the etch rates of Si:$siO_2$). This type of hard mask is patterned by conventional dry-etching (e.g., plasma etching) techniques, the PR is then stripped, and the $SiO_2$ serves as the mask during the etching of the Si regions 83*a* Finally, if a combination of a PR layer 86 and a hard mask 87 is used during the etching of Si regions 83*a*, as shown in FIG. 5, then thinner layers of PR and hard mask $SiO_2$ can advantageously be used.

The PR is next patterned using standard photolithography to form serpentine openings 86*a*, and a dry-etching process is used to transfer that pattern into the Si regions 83*a* (only their cross-section is shown in FIG. 5). After the PR is stripped, the structure shown in FIG. 6 is obtained. The serpentine springs are designated 88. This figure demonstrates why an SOI wafer is the preferred starting material; that is, the buried oxide layer 81 serves as an etch-stop both in the above spring-forming step and in a subsequent etching step used to form cavity 89 (FIG. 8), as described below.

Figure 7:
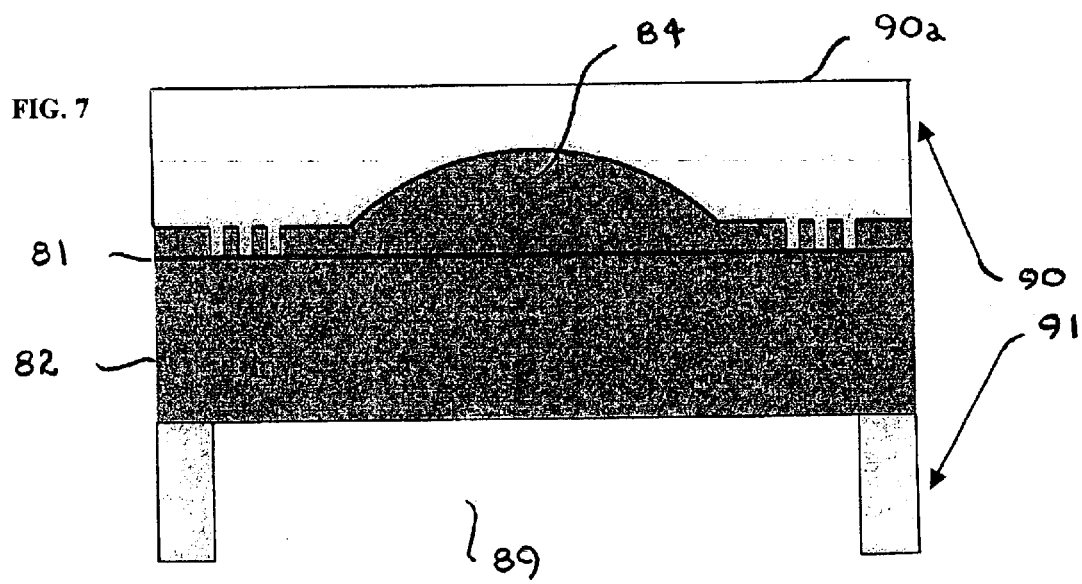
Figure 8:
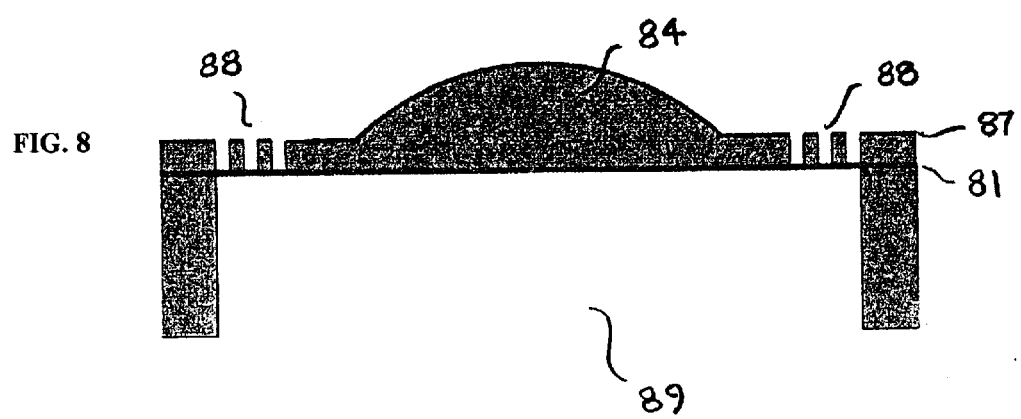

As shown in FIG. 8, the next phase of the fabrication of the apparatus involves the formation of a cavity 89 below the microlens 84, which allows the microlens to be suspended by its serpentine springs 88. As shown in FIG. 7, the first step is to cover the top surface of the microlens with a relatively thick PR layer 90, which protects the top surface of the microlens and provides a flat top surface 90*a* of the PR layer. During the etching process (e.g., plasma etching, which generates heat), the wafer is cooled by clamping it to a chuck. Helium gas is used to provide thermal contact between the wafer and the chuck. The flat surface 90*a* is advantageous in reducing the helium leak-rate into the etching chamber. The thickness of PR layer 90 should be at least 50 μm in this phase of the process.

After the microlens has been protected by the PR layer 90, the wafer is flipped, and an opening 89 is defined photolithographically, using a PR layer 91, as shown in FIG. 7. The patterned PR layer 91 should be at least 20 μm thick to facilitate etching the bottom Si layer 82 to a depth of about 700 μm. Typically the etchant for this step is $SF_6$-based, and Si:PR etch rate selectivities of at least 50:1 are realized.

The uniformity of this etching step, as well as its selectivity to etching Si over $SiO_2$, determines the thickness of the buried $SiO_2$ layer 81 in the SOI wafer. An etch uniformity in this step of ±5% translates into a variation of ±10% in the etch-rate across the wafer. This variation implies that in some areas of the wafer, the etching step that forms cavity 89 may expose the $SiO_2$ layer 81 (from the bottom), whereas in other areas this same etching step may leave layer 81 buried beneath about 70 μm of residual Si from layer 82. The structure of FIG. 7 is then exposed to dry etching (e.g., plasma etching) until any residual Si is removed. For purposes of illustration, if we assume Si:$SiO_2$ etch-rate selectivities of at least 100:1 in this step, the buried $SiO_2$ layer 81 should be at least 0.7 μm thick. However, a slightly thicker layer (at least 1μm) is preferable to provide a margin of safety in the etching step.

After the dry etching process, the PR layers 90 and 91 are stripped, resulting in the structure shown in FIG. 8. Next, a suitable etchant (e.g., an HF solution) removes the $SiO_2$ layers 81 and 87 shown in FIG. 8.

Figure 9:
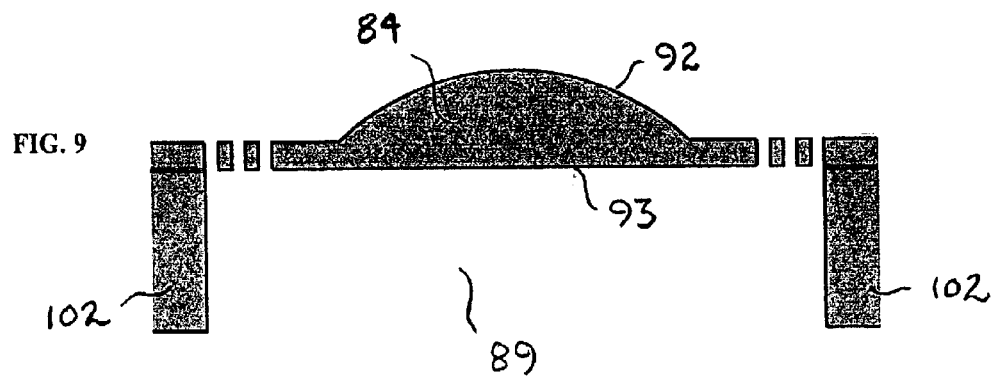

Then, as shown in FIG. 9, anti-reflection coatings (ARCs) 92 and 93 are deposited on the top and bottom surfaces of the microlens 84. Each ARC could be, for instance, a single layer of dielectric material (e.g., $Si_3N_4$) with thickness equal to ¼ of the operating center wavelength, or a multi-layered dielectric structure designed to provide low reflectance over a broad range of wavelengths.

Note, here, that the active microlens of FIG. 9 includes a support structure or spacer 102, which will allow the active microlens to be suspended over the stationary one. The support structure 102 forms a cavity 89 into which the stationary lens protrudes, as shown in FIG. 13.

Although the support structure may take on a variety of geometric shapes, one of the simplest is a square (depicted in top view in FIG. 1), which readily allows a circular microlens (in top view) to be positioned therein.

Stationary Lens

Figure 10:
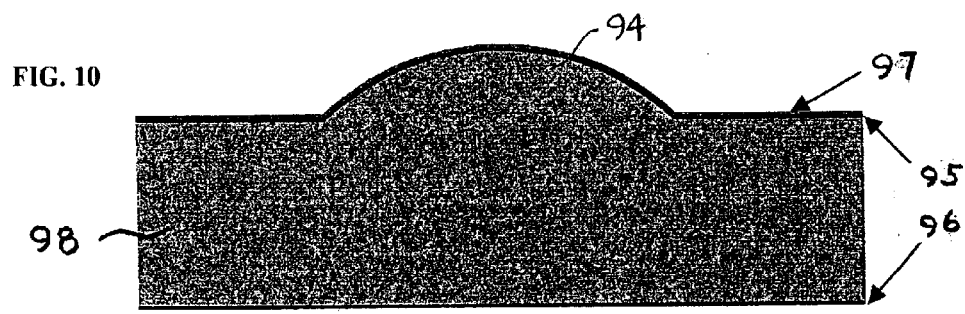
Figure 11:
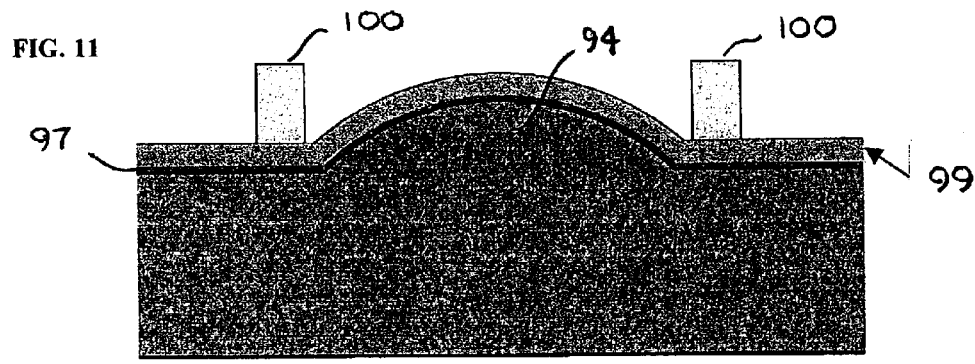
Figure 12:
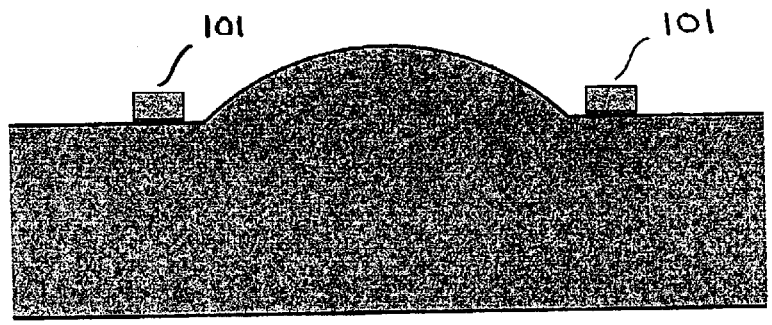

In conjunction with FIGS. 10–12 we describe the fabrication of the stationary lens and the electrodes associated with it.

The stationary microlens 94 shown in FIG. 10 may be fabricated from a standard semiconductor (e.g., Si) wafer, an SOI wafer is not required. In principle, however, other materials (e.g., fused silica, quartz, optical glass, zinc oxide or even plastic) or other semiconductors (e.g., SiGe) can be used as well.

Assuming that we utilize a standard Si wafer 98, the initial steps used to form the hemispherical shape of microlens 94 are similar to those used to shape the active microlens 84, as described in conjunction with FIGS. 3 and 4. At this point, the back of the wafer 98 is polished (if the standard Si wafer has a rough back surface) and ARC coatings 95 and 96 are deposited on the top and bottom surfaces, respectively. Then, a sacrificial layer 97 (e.g., 200 nm thick $SiO_2$) is deposited on the top ARC 95. Layer 97 protects the underlying ARC 95 during an etching step to be discussed below. The structure obtained is shown in FIG. 10. Alternatively, it may be advantageous to cover the bottom ARC 96 with a protective layer as well.

As shown in FIG. 11, in order to begin the process of forming electrodes around the periphery of the stationary microlens 94, a metal layer 99 is first deposited on the protective layer 97. After metal deposition (e.g., 0.5-$\mu$m-thick Al), a PR layer is deposited. The PR layer is patterned by standard photolithography to form a multiplicity of PR pillars 100 located around the periphery of the stationary microlens 94. In the two dimensional view of FIG. 11 only two pillars are shown; however, in three dimensions more than two, and typically four, pillars would be used to enable, for example, four electrodes (18a, 18b) to be subsequently formed, as shown in FIG. 1. Corresponding electrodes are designated by numeral 101 in FIGS. 12–14.

Next, the patterned wafer is etched to transfer the PR pattern into the metal layer 99, thereby defining the electrodes 101, as shown in FIG. 12. This step is also used to form conductors or wiring (not shown) to allow electrical signals to be applied the electrodes 101. (Corresponding wiring is not necessary for the movable microlens because it is grounded and hence carries no current. A conductive epoxy is sufficient to couple the movable microlens to ground.) A wet or a dry etch step is then used to remove the protective layer 97 leaving the structure shown in FIG. 12. When using $Si_3N_4$ as the material of the ARCs 95 and 96 and $SiO_2$ as the material of the protective layer 97, a suitable wet etchant comprises an ethylene-glycol/HF solution or an ethylene-glycol/BOE solution.

Assembly

In accordance with one embodiment of our invention, the active microlens (FIG. 9) and the stationary microlens (FIG. 12) are the assembled to form the apparatus shown in FIG. 13. This assembly includes a support structure (or spacer) 102, which was formed in FIG. 8 and now is interposed between the two lenses so as to support or suspend the active lens 84 coaxially over the stationary lens 94. Its height is sufficient to provide between the two microlenses a gap that allows their separation and/or tilt to be adjusted electrically.

Illustratively, the support structure comprises a semiconductor material (e.g., Si or SiGe) and is affixed around the periphery of the stationary lens by an adhesive material (e.g., epoxy or polyimide).

In operation, wiring (not shown) couples a source of voltage to selected ones of the bottom electrodes 101. The same voltage level may be applied to all of the electrodes 101, so as to alter only the vertical separation between the two microlenses, or different voltage levels may be applied to different ones of the electrodes 101, so as to alter the tilt of the active (or movable) microlens as well as the vertical separation between the two microlenses. On the other hand, in FIG. 13 the active microlens 84 and the structure 102 are not electrically isolated from one another. As noted above, the active microlens and the support structure are coupled to a source of ground potential.

In the embodiment of FIG. 13, the hemispherical surfaces of the two microlenses face in the same direction, akin to the design of FIG. 1(b), but excluding the curved surface on the back of microlens 12b. Alternatively, as shown in FIG. 14, the active microlens can be flipped and mounted so that the hemispherical surfaces of the two microlenses face one another, akin to the design of FIG. 1(a). In this configuration, the Si support structure 102 (FIG. 13) may not be high enough to allow for adequate separation between the two microlenses. In this case, an alternative taller support structure 103 (FIG. 14) may be interposed between the two microlenses. This support structure need not be made from semiconductor material; a suitable alternative is a photolithography-definable polyimide.

Assuming the focal length for each of the active and stationary microlenses is $f_1=f_2=0.4$ mm and their vertical separation d=700 $\mu$m, equation (1) gives the effective focal length of the apparatus of either FIG. 13 or FIG. 14 as $f_{12}=1.6$ mm.

Fabrication Method II

The fabrication technique below describes a process flow for making a preferred adjustable compound microlens apparatus of the type shown in FIG. 33. We describe the fabrication of the active (movable) lens, the stationary lens and the MEMS, as well as the assembly of the various components. The technique describes array of such apparatuses, which, however, can be diced or otherwise separated into individual apparatuses, if so desired.

This fabrication technique, although slightly more complicated, results in a design that has significant advantages our previous designs shown in FIGS. 13 and 14. In particular, in the microlens apparatus of FIG. 33 the active lens and the walls of the support structure are isolated from one another, allowing the active lens to be powered, while the walls and the stationary lenses are held at ground potential. Simulations show that this design is much better behaved than the previous one; that is, the new design has lower operating voltage and larger operational displacement.

In addition, the incorporation of a second etch-stop layer in Method II addresses the control issue associated with the spring formation in Method I.

Active Lens

In conjunction with FIGS. 15–31 we describe the fabrication of a modified active lens.

Figure 15:
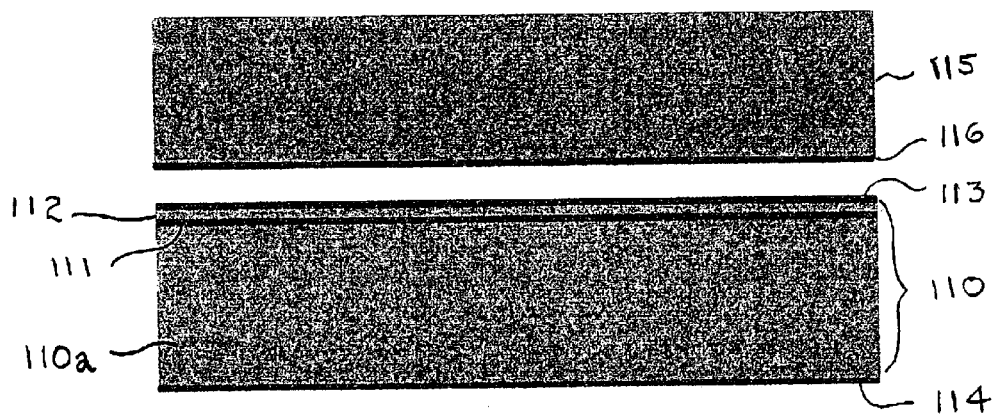
FIGS. 15–32 are schematic, cross-sectional views used to describe various process steps in the fabrication of a compound microlens apparatus shown in FIG. 33.

As in Method 1, the starting material is an SOI wafer 110 having a 1-$\mu$m-thick buried $SiO_2$ layer 111, as shown in the bottom portion of FIG. 15. The thickness of the top Si layer 112 should be equal to approximately the thickness of the springs in the active microlens structure. In Method I, the thickness was about 5 $\mu$m, but since the etch-uniformity requirements of Method II are less stringent, an even thinner top Si layer 112 can be used. Layer 112 will also serve as an electrical conductor to the individual active microlenses and, therefore, should have a reasonably high doping level (e.g., in the range of about $10^{16}$–$10^{17}$ cm$^{-3}$, which is sufficient to provide adequate electrical conduction without causing too much optical absorption).

Next, the SOI wafer 110 is oxidized, on both sides, to produce $SiO_2$ layers 113 and 114 each approximately 1 $\mu$m thick.

As shown in the top portion of FIG. 15, a second wafer 115 (not SOI, but bulk Si) is oxidized as well to form a $SiO_2$ layer 116. [Although this step may also form an oxide layer (not shown) on the top surface of bulk wafer 115, the presence of such an oxide layer is moot since ultimately the top surface will be ground and polished.] The oxidized SOI and bulk Si wafers are joined by bonding together the exposed surfaces of oxide layers 113 and 116. The bonded oxide layers are indicated by reference numeral 117 in FIG. 16. (Although not shown in FIG. 16, in practice the thickness of layer 117 would be approximately equal to the sum of the thicknesses of layers 113 and 116.) After bonding of these layers is complete, the top surface of the bulk Si wafer 115 is ground and polished to yield a top Si layer 115a (FIG. 16) in which the active microlenses will be formed. Therefore, layer 115a should have a thickness that is about 0.5 µm greater than the desired microlens sag. In Method I the sag is illustratively about 25.4 µm, which is also applicable to Method II. Accordingly, the total thickness of layer 115a should be about 26 µm.

Figure 16:
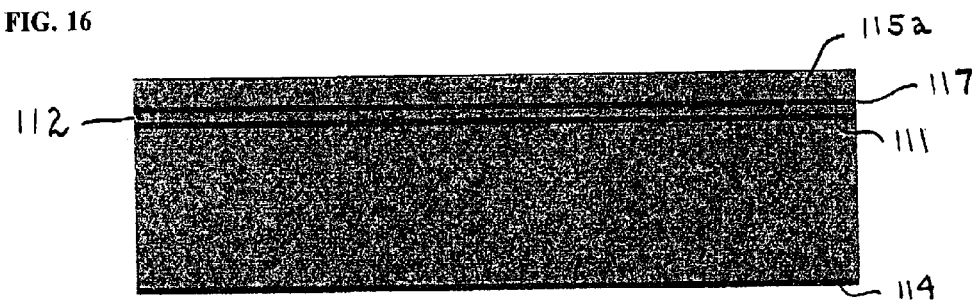
Figure 17:
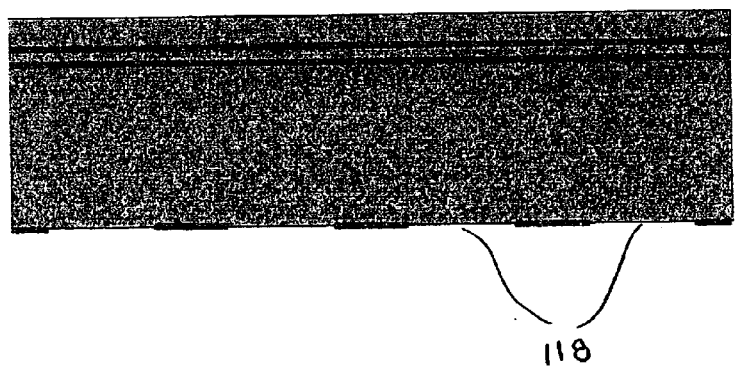
Figure 18:
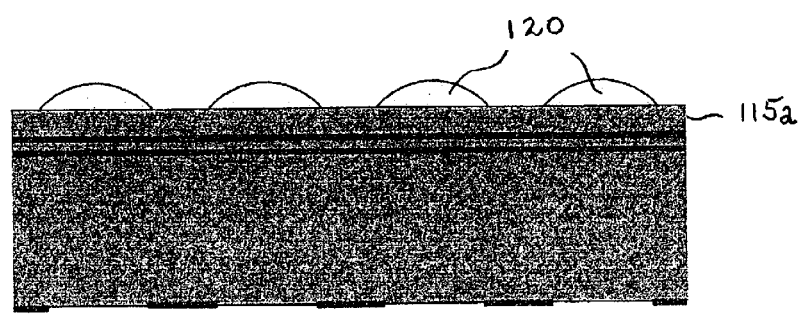
Figure 19:
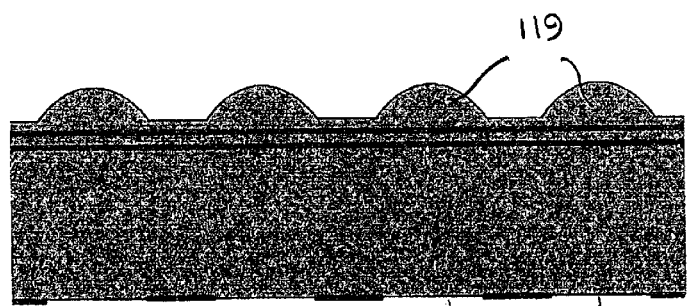

The resulting structure shown in FIG. 16 is known as double SOI. This type of wafer is also available from commercial sources, such as Soitec Inc., which has offices in Bernin, France and Peabody, Mass.

Next, the oxide layer 114 on the back of the wafer is patterned (FIG. 17) using standard photolithographic and etching techniques to form circular openings 118. Each opening will eventually be aligned with an active microlens and will have a diameter slightly smaller the microlens aperture. Using the illustration of Method I, where the aperture diameter was 0.4 mm, we estimate that the diameter of the openings 118 should be approximately 0.38 mm.

At this point the active microlenses 119 (FIG. 19) are formed in Si layer 115a using hemispherically shaped PR masks 120 (FIG. 18) in the manner described in Method 1, except that the microlenses 119 are aligned to the openings 118 on the back of the wafers.

Figure 20:
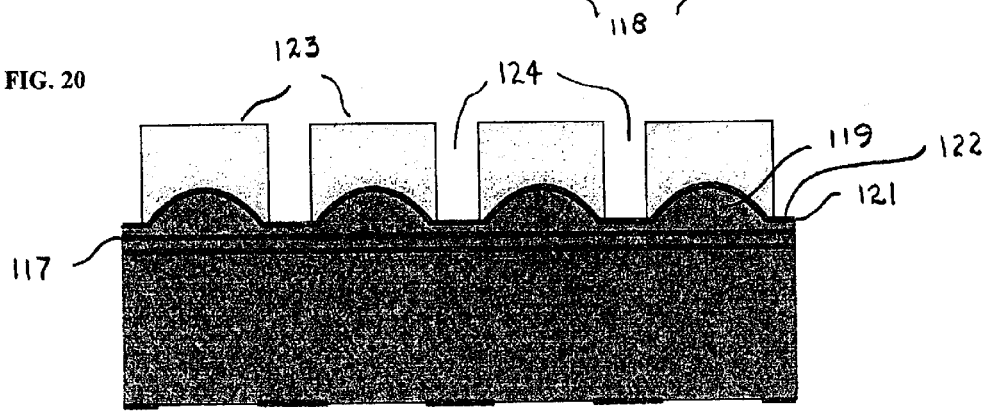

An ARC 121 is then deposited on the microlenses 119 as shown in FIG. 20. As before, a $Si_3N_4$ layer with ¼ wavelength thickness can be used for the ARC. A protective $Sio_2$ layer 122, approximately 200 nm thick, is deposited on the ARC 121.

Figure 21:
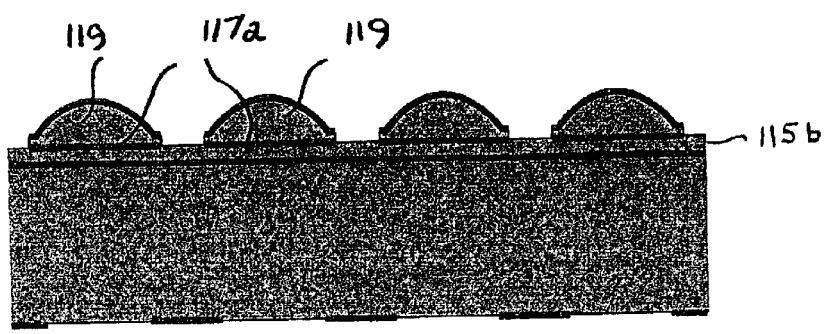

The next step isolates the individual lenses from one another. To do so, a patterned PR layer 123, is photolithographically formed on the protective layer 122. The PR layer should be thick enough to protect the microlenses during the etching process (i.e., the etching that removes $Si/SiO_2$ material exposed by the openings in PR). In a worst-case scenario, where the PR layer planarizes the wafer, as above, the PR layer should be at least 26 µm thick. (In reality, complete planarity is not achieved in most cases, and so it is possible to use a much thinner PR) Openings 124 in the patterned PR expose regions between adjacent microlenses These regions are etched down to Si layer 115b, which leaves each microlens 119 isolated atop a segment 117a of oxide layer 117, as shown in the structure of FIG. 21. Actually, this etching step removes the following layers within the exposed regions: the protective layer 122, ARC 121, Si layer 115a and the $SiO_2$ layer 117.

Figure 22:
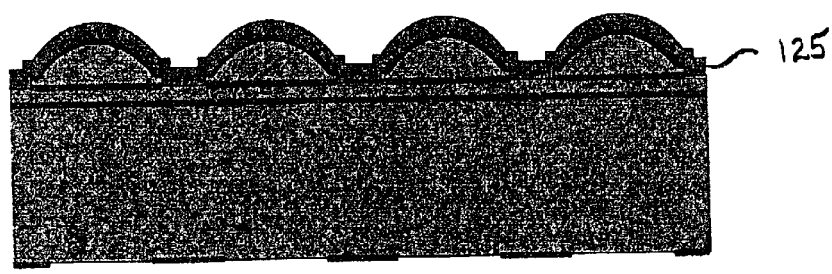
Figure 23:
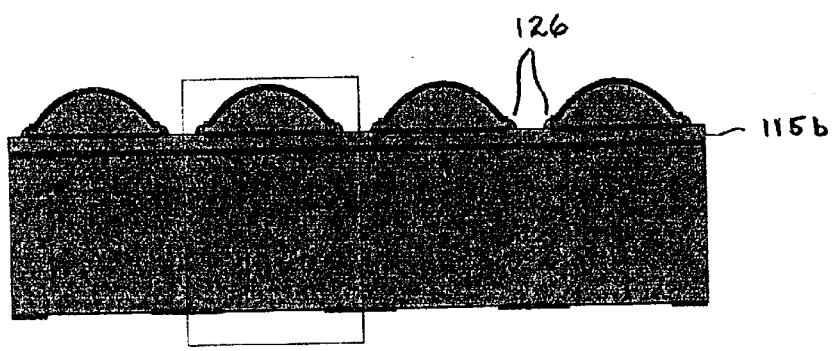
Figure 24:
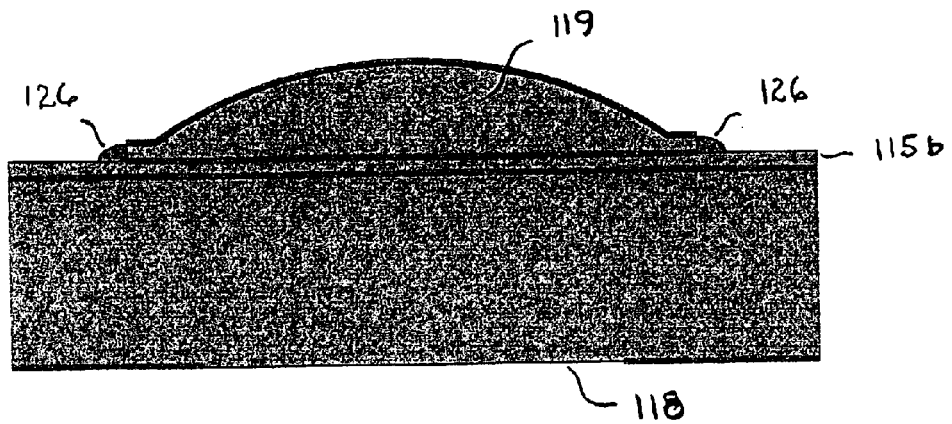

After the individual active microlenses have been isolated, a doped polysilicon (or amorphous Si) layer 125, about 500 nm thick (the exact thickness is not critical and can vary from application to application) is then deposited over the entire wafer (FIG. 22). Layer 125 is then etched back to form spacers 126 (FIGS. 23 and 24) that will ultimately provide an electrical connection to the Si layer 115b below. In top view, the spacers form a complete annulus around the active lens. FIG. 24 shows an exploded view of the individual active microlens of FIG. 23 outlined by the dotted line rectangle.

Figure 25:
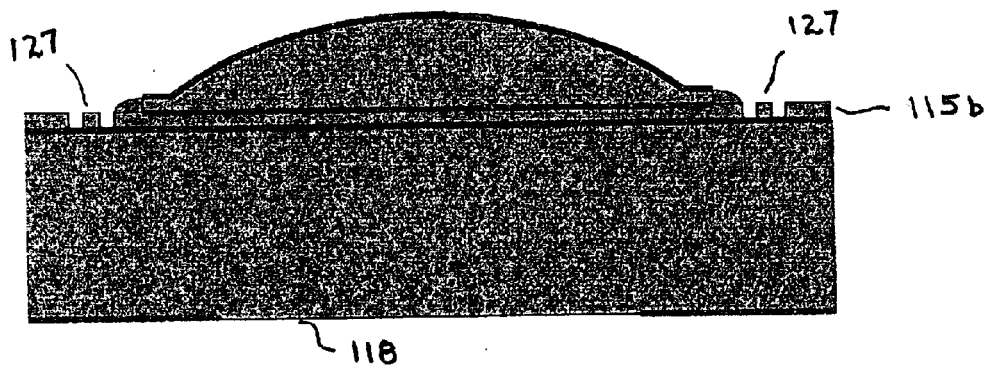

As shown in FIG. 25, the next part of the process involves photolithographic patterning and etching of Si layer 115b. The patterned Si has a dual purpose: it forms the electrical routing (wiring) to each active microlens, and it serves as the serpentine spring material.

Next, a cavity 128 (FIG. 28) will be opened in the backside of the wafer. The cavity has two sections arranged in tandem along the optical axis of microlens 119: a narrower section 128a (FIG. 28; corresponding to the width of opening 118 shown in FIGS. 24–26), and a wider section 128b (FIG. 28; corresponding to the width of opening 131 shown in FIG. 26). The cavity is formed in multiple steps that will be described in conjunction with FIGS. 26 and 27.

Figure 26:
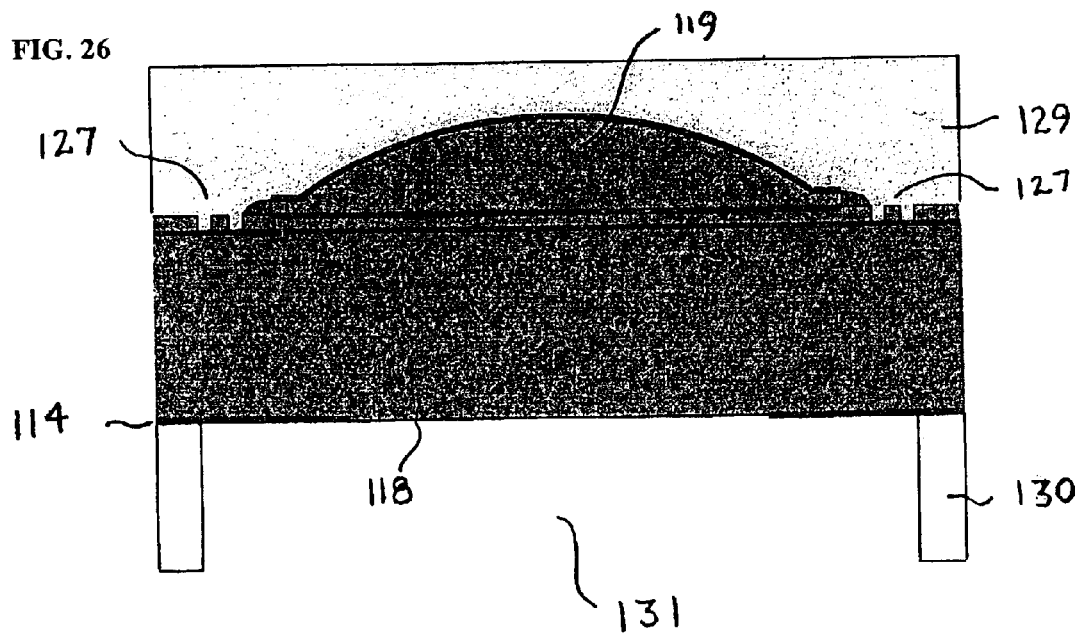

First, thick PR layers 129 and 130 FIG. 26) are deposited on the top and bottom of the wafer, respectively. As before, the top PR layer 129 should be thick enough to provide a planar surface, which allows the wafer to be placed in the chuck of an etching tool. Then, the PR layer 130 on the bottom of the wafer is photolithographically patterned to form an opening 131, which is wide enough to encompass the microlens 119 and its springs 127 (FIG. 26).

Figure 27:
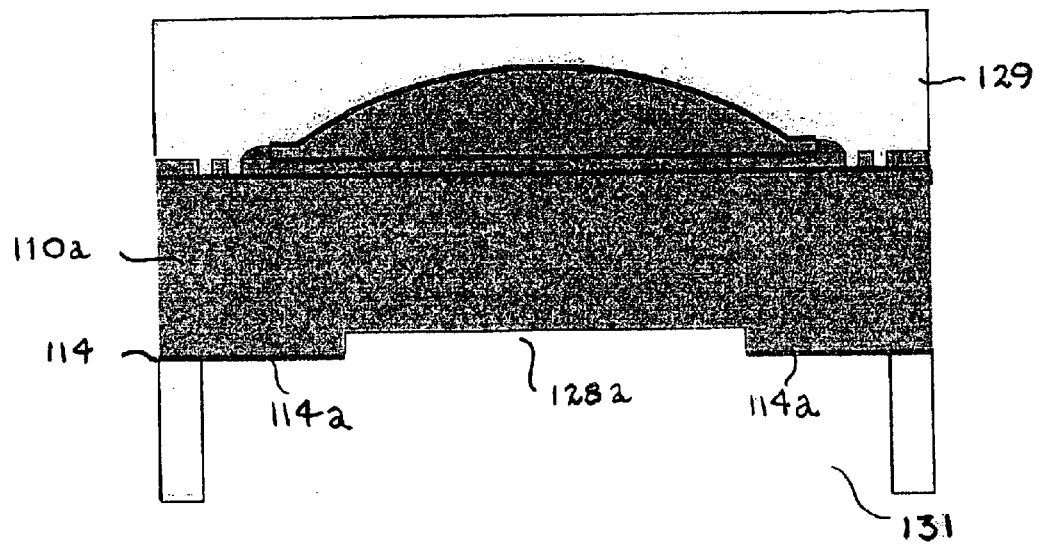

Second, as shown in FIG. 27, the opening 118 in oxide layer 114 is used to form the narrower cavity section 128a; that is, illustratively about 100 µm of Si is etched from the back of the wafer (Si region 110a) using an $SF_6$-based etchant having an etch-rate selectivity of >100:1 for $Si:SiO_2$) in conjunction with a 1-µm-thick oxide mask.

Figure 28:
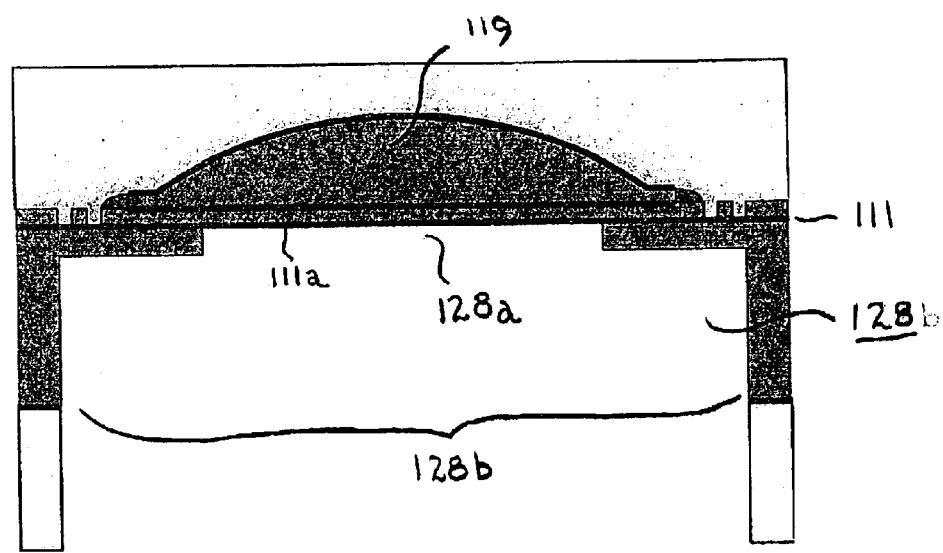
Figure 29:
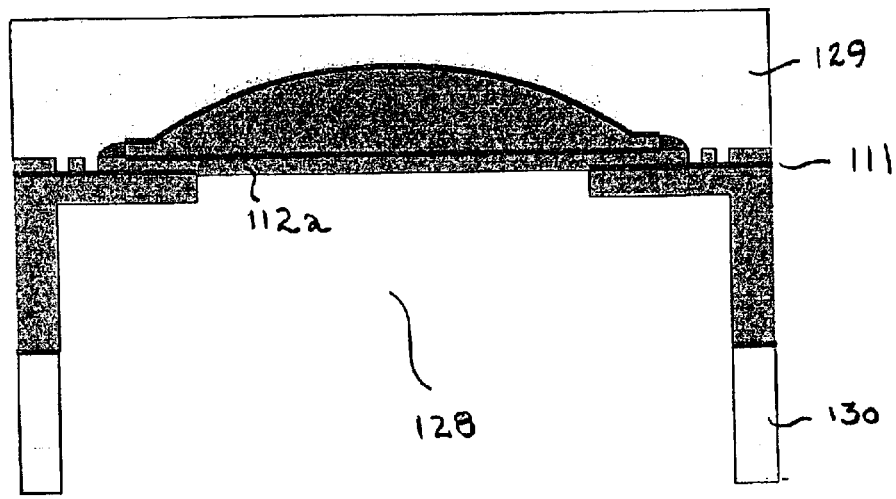

Third, the remaining exposed portions 114a of the oxide layer 114 are etched away, and the deep etching of Si region 111a is resumed until the central portion 11a of buried oxide layer 111 is exposed (FIG. 28). The deep etching step forms the wider cavity section 128b and translates the shape of the narrower cavity section 128a upward until it abuts the central portion 111a of buried oxide layer 111.

After the cavity-forming process exposes the central portion 111a of the buried oxide 111 under each microlens, that portion is etched away (FIG. 29) to avoid having multiple refection surfaces in the light path. Then, the exposed central portion 112a of Si layer 112 is removed (e.g., using again an $SF_6$-based etchant) to produce the structure shown in FIG. 30. This step again exposes oxide, but this time the central portion 117a of oxide layer 117.

Figure 30:
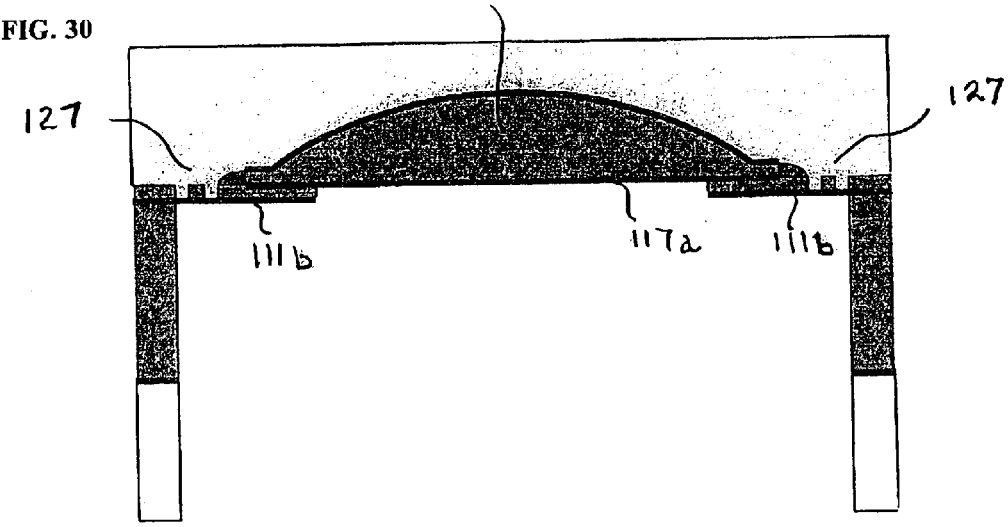
Figure 31:
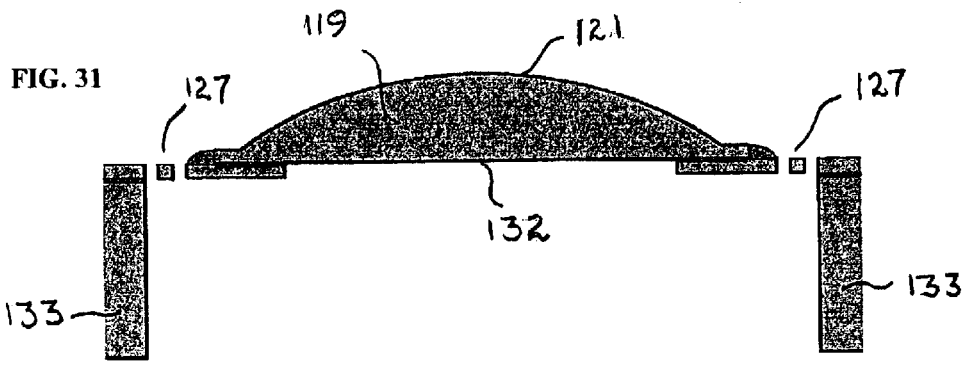

At this point the PR is stripped, and the microlenses are released; that is, as shown, is FIGS. 30 and 31 the peripheral portions 111b (under the springs 127) of buried oxide layer 111 and the central portion 117a (on the bottom of the microlens 119) of oxide layer 117 are etched away, as shown in FIG. 31. Finally, an ARC 132 is deposited on the bottom of the microlens 119 (and incidentally on other backside surfaces) with similar thickness requirements discussed earlier regarding the formation of ARC 121 on the topside of the microlens. FIG. 31 shows the final form of the active microlens resiliently suspended from support structure 133 by means of springs 127.

Stationary Lens

Figure 32:
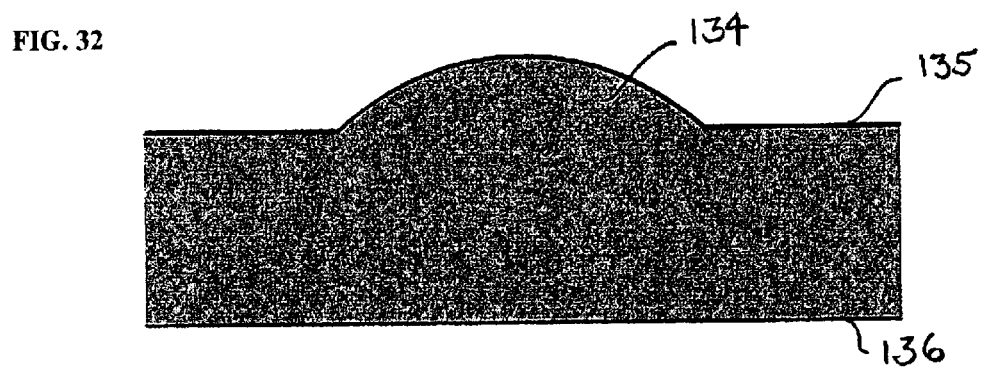

The process for making the stationary microlens 134 (FIG. 32) is similar to that described in Method I, but without the metal layer 99 (FIG. 11) used to form the electrodes 101 (FIGS. 12–14). The microlens 134 is shown in FIG. 32 after ARCs 135 and 136 have been deposited on its topside and backside, respectively.

Stationary microlens 134 of Method II is simpler to fabricate than the corresponding microlens 94 of Method I since the former requires only one photolithography step (as opposed to two such steps in Method I) and does not require the deposition of oxides and metal to form the electrodes.

Assembly

The active microlens 119 and the stationary microlens 134 are then assembled by mounting the support structure 133 on the peripheral surfaces of the stationary microlens as shown in FIG. 33. Typically the support structure 133 is affixed to the peripheral surfaces by means of a suitable adhesive material (e.g., epoxy or polyimide).

In this design, both the stationary lens 134 and the walls of the support structure are coupled to a source of ground potential, whereas the active microlens 119 is powered (i.e., coupled to a source of voltage).

Metal pads (not shown), which facilitate making electrical connections, can be deposited on the top surface of the assembly by using standard evaporation of metal through the openings in a shadow mask. Alternatively, the pads can be formed by the following process: an additional photolithographic step after the formation of the spacers (FIG. 24), evaporation of a metal layer, and a well-known lift-off technique.

It is to be understood that the above-described arrangements are merely illustrative of the many possible specific embodiments that can be devised to represent application of the principles of the invention. Numerous and varied other arrangements can be devised in accordance with these principles by those skilled in the art without departing from the spirit and scope of the invention. In particular, the active and stationary microlenses of the apparatus of FIG. 33, as with the apparatuses of FIGS. 13 and 14, can also be fabricated from materials such as SiGe, fused silica, quartz, zinc oxide or even plastic.

We claim:

1. A microlens apparatus comprising:
   a substrate,
   first and second optical microlenses mounted on said substrate, characterized in that said microlenses are separated from one another along their optical axes so as to form a compound lens; at least one of said microlenses being movable relative to the other in at least the direction of said axes;
   said apparatus further includes a MEMS controller for electrically controlling the position of the at least one movable microlens; and
   the position of said substrate is independent of the controlling action of said controller.

2. The apparatus of claim 1, wherein one of said microlenses is movable and the other is stationary.

3. The apparatus of claim 1, wherein both of said microlenses are movable.

4. The apparatus of claim 2, wherein said movable microlens serves as a first electrode, said MEMS controller includes a structure supported by said stationary microlenses, said structure having an opening in which said movable microlens is resiliently supported, and further includes a multiplicity of second electrodes disposed adjacent said stationary microlens, said first and second electrodes cooperating to control the position of said movable microlens in response to an electrical signal applied between said second electrodes and said movable microlens.

5. The apparatus of claim 4, wherein said MEMS controller includes resilient means coupled between said structure and said movable microlens.

6. The apparatus of claim 5, wherein said resilient means includes at least one serpentine spring coupled between said movable microlens and said structure.

7. The apparatus of claim 6, wherein said stationary microlens is essentially circular, and said second electrodes are essentially equally spaced around the periphery of said stationary microlens.

8. The apparatus of claim 4, wherein said movable microlens and said structure are not electrically isolated from one another, said movable microlens is coupled to a source of electrical ground potential, and said second electrodes are coupled to a source of voltage.

9. The apparatus of claim 4, wherein said movable microlens and said structure are electrically isolated from one another, said movable microlens is coupled to a source of voltage, and said second electrodes are coupled to a source of electrical ground potential.

10. Apparatus including an array of optical elements wherein each of said elements comprises an apparatus according to claim 1.

11. The apparatus of claim 10, wherein the microlenses of each of said elements comprises semiconductor material.

12. A subsystem including a first array of optical sources and a second array of optical receptors, wherein the apparatus of claim 10 optically couples said first array to said second array.

13. The subsystem of claim 12, wherein said sources comprise optical input fibers and said receptors comprise optical output fibers.

14. A method of compensating for variations in an optical parameter of a first optical apparatus in an array of such apparatuses, each of said apparatuses including (i) a substrate, (ii) a compound microlens having an optical axis and including at least two component microlenses at least one of said component microlenses being movable relative to the other, component microlens in at least the direction of said axis, said compound microlens being mounted on said substrate, (iii) a MEMS controller for electrically controlling the position of said at least one movable component microlens, said controller producing a mechanical action in response to an electrical signal applied thereto, and (iv) the position of said substrate being independent of the controlling action of said controller, said method comprising the steps of:
   (a) determining that said first apparatus has a value of said parameter different from a standard value; and
   (b) applying an electrical signal to said MEMS controller of said first apparatus, thereby causing the controller of said first apparatus to perform said mechanical action that moves said at least one movable component microlens of said first apparatus to make the value of said parameter of said first apparatus closer to that of said standard value.

15. The method of claim 14, wherein said standard value is the value of said optical parameter in a second apparatus.

16. The method of claim 15, wherein said first and second apparatuses are included in an array of such apparatuses, and step (a) includes determining that a multiplicity of said apparatuses have different values of said parameter than said second apparatus.

17. The method of claim 14, wherein said optical parameter is the effective focal length of an apparatus and step (a) determines that the effective optical focal length of said first apparatus is different from said standard value.

18. The method of claim 17, wherein said mechanical action alters a parameter of said at least two component microlenses selected from the group consisting of: their vertical separation along a common optical axis, their horizontal separation between parallel optical axes, and their tilt between non-parallel optical axes.

19. The method of claim 14, further including, after step (b), the additional step (c) of affixing all of said at least one movable component microlenses into position.

20. The method of claim 14, wherein the sum of the focal lengths of said at least two component microlenses is approximately equal to the separation between said at least two component microlenses.

21. The apparatus of claim 1, wherein the sum of the focal lengths of said first and second component microlenses is approximately equal to the separation between said first and second component microlenses.

* * * * *